US012786215B2

(12) United States Patent
Levy et al.

(10) Patent No.: US 12,786,215 B2
(45) Date of Patent: Nov. 3, 2026

(54) NETWORK ALERT ENRICHMENT

(71) Applicant: PALO ALTO NETWORKS (ISRAEL ANALYTICS) LTD., Tel Aviv (IL)

(72) Inventors: Erez Levy, Ganey Tikva (IL); Yarom Dadon, Rishon Le-Zion (IL); Yuval Yarom, Tel Aviv Yafo (IL); Tomer Niv, Carmit (IL); Tom Redlus, Tel Aviv (IL); Jonathan Shai Isakov, Givatayim (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 129 days.

(21) Appl. No.: 18/361,850

(22) Filed: Jul. 30, 2023

(65) Prior Publication Data

US 2025/0039204 A1 Jan. 30, 2025

(51) Int. Cl.
*H04L 9/40* (2022.01)

(52) U.S. Cl.
CPC ...... *H04L 63/1425* (2013.01); *H04L 63/0236* (2013.01); *H04L 63/1416* (2013.01)

(58) Field of Classification Search
CPC ............. H04L 63/1425; H04L 63/0236; H04L 63/1416
See application file for complete search history.

(56) References Cited

U.S. PATENT DOCUMENTS

| | | | |
|---|---|---|---|
| 5,991,881 | A | 11/1999 | Conklin et al. |
| 6,347,374 | B1 | 2/2002 | Drake et al. |
| 6,704,874 | B1 | 3/2004 | Porras et al. |
| 7,003,790 | B1 | 2/2006 | Inoue et al. |

(Continued)

FOREIGN PATENT DOCUMENTS

| | | | |
|---|---|---|---|
| CA | 3041875 | A1 | 11/2019 |
| CN | 1612532 | A | 5/2005 |

(Continued)

OTHER PUBLICATIONS

Niksun, "Network Intrusion Forensic System (NIFS) for Intrusion Detection and Advanced Post Incident Forensics", Whitepaper, pp. 1-12, Feb. 15, 2010.

Shulman, A., "Top Ten Database Security Threats How to Mitigate the Most Significant Database Vulnerabilities", White Paper, pp. 1-14, year 2006.

U.S. Appl. No. 17/676,275 Office Action dated Feb. 29, 2024.

(Continued)

*Primary Examiner* — Oleg Survillo
(74) *Attorney, Agent, or Firm* — Meitar Patents LTD.; Daniel Kligler

(57) ABSTRACT

A method, including collecting, during a time period from multiple computers, reports of events, each of the events including communication activity performed by a process having a respective ID and executing on one of the computers. Respective sets of features including characteristics of the activity are generated from the reports, and a model is trained for identifying, based on the features of one or more of the events, the ID of one of the processes performing the one or more of the events. An alert indicating malicious activity and referencing one or more reports of additional communication events performed by a given computer is received from a network management device, and the model is applied to the one or more reports so as to identify, on the given computer, a given ID of a given process responsible for the alert. Finally, a protective action is initiated for the given process.

22 Claims, 3 Drawing Sheets

(56) References Cited

U.S. PATENT DOCUMENTS 7,007,301 B2 2/2006 Crosbie et al.
7,178,164 B1 2/2007 Bonnes
7,181,769 B1 2/2007 Keanini et al.
7,523,016 B1 4/2009 Surdulescu et al.
7,684,568 B2 3/2010 Yonge, III et al.
7,694,150 B1 4/2010 Kirby
7,703,138 B2 4/2010 Desai et al.
7,712,134 B1 5/2010 Nucci et al.
7,752,665 B1 7/2010 Robertson et al.
7,908,655 B1 3/2011 Bhattacharyya et al.
8,245,298 B2 8/2012 Pletka et al.
8,397,284 B2 3/2013 Kommareddy et al.
8,429,180 B1 4/2013 Sobel et al.
8,490,190 B1 7/2013 Hernacki et al.
8,516,573 B1 8/2013 Brown et al.
8,516,586 B1 * 8/2013 Jensen ................ H04L 63/1425 713/153
8,555,388 B1 10/2013 Wang et al.
8,578,345 B1 11/2013 Kennedy et al.
8,607,353 B2 12/2013 Rippert, Jr. et al.
8,620,942 B1 12/2013 Hoffman et al.
8,677,487 B2 3/2014 Balupari et al.
8,762,288 B2 6/2014 Dill
8,769,681 B1 7/2014 Michels et al.
8,925,095 B2 12/2014 Herz et al.
8,966,625 B1 2/2015 Zuk et al.
9,038,178 B1 5/2015 Lin
9,118,582 B1 8/2015 Martini
9,147,071 B2 9/2015 Sallam
9,231,962 B1 1/2016 Yen et al.
9,319,421 B2 4/2016 Ferragut et al.
9,342,691 B2 5/2016 Maestas
9,378,361 B1 6/2016 Yen et al.
9,386,028 B2 7/2016 Altman
9,531,614 B1 12/2016 Nataraj et al.
9,531,736 B1 12/2016 Torres et al.
9,690,606 B1 6/2017 Ha et al.
9,690,933 B1 6/2017 Singh et al.
9,736,251 B1 8/2017 Samant et al.
9,773,112 B1 9/2017 Rathor et al.
9,979,739 B2 5/2018 Mumcuoglu et al.
9,979,742 B2 5/2018 Mumcuoglu et al.
10,027,694 B1 7/2018 Gupta et al.
10,075,461 B2 9/2018 Mumcuoglu et al.
10,140,453 B1 11/2018 Fridakis
10,181,032 B1 1/2019 Sadaghiani et al.
10,237,875 B1 3/2019 Romanov
10,360,367 B1 7/2019 Mossoba et al.
10,423,789 B2 9/2019 Barak
10,587,642 B1 3/2020 Herman-Saffar et al.
10,706,144 B1 7/2020 Moritz et al.
10,728,262 B1 7/2020 Vaswani et al.
10,728,281 B2 7/2020 Kurakami
10,873,596 B1 12/2020 Bourget et al.
10,893,068 B1 * 1/2021 Khalid .................. G06F 21/554
10,904,277 B1 1/2021 Sharifi Mehr
11,070,573 B1 * 7/2021 Edwards ............ H04L 63/1416
11,100,199 B2 8/2021 Subramaniam
11,140,194 B2 10/2021 Hecht
11,178,168 B1 11/2021 Lin et al.
11,184,376 B2 11/2021 Meshi et al.
11,277,423 B2 3/2022 Brown
11,316,872 B2 4/2022 Meshi et al.
11,501,261 B1 11/2022 Schemers et al.
11,509,680 B2 11/2022 Steimberg et al.
11,956,253 B1 4/2024 Lin et al.
12,045,610 B1 7/2024 Myers et al.
12,380,389 B2 8/2025 Schmidt et al.
2002/0059078 A1 5/2002 Valdes et al.
2002/0133586 A1 9/2002 Shanklin et al.
2003/0110396 A1 6/2003 Lewis et al.
2003/0133443 A1 7/2003 Klinker et al.
2004/0003286 A1 1/2004 Kaler et al.
2004/0015728 A1 1/2004 Cole et al.
2004/0117658 A1 6/2004 Klaes
2004/0199793 A1 10/2004 Wilken et al.
2004/0210769 A1 10/2004 Radatti et al.
2004/0250169 A1 12/2004 Takemori et al.
2004/0260733 A1 12/2004 Adelstein et al.
2005/0015624 A1 1/2005 Ginter et al.
2005/0018618 A1 1/2005 Mualem et al.
2005/0060295 A1 3/2005 Gould et al.
2005/0069130 A1 3/2005 Kobayashi
2005/0071330 A1 3/2005 Douceur et al.
2005/0123138 A1 6/2005 Abe et al.
2005/0128989 A1 6/2005 Bhagwat et al.
2005/0183120 A1 8/2005 Jain et al.
2005/0216749 A1 9/2005 Brent
2005/0249214 A1 11/2005 Peng
2005/0262556 A1 11/2005 Waisman et al.
2005/0262560 A1 11/2005 Gassoway
2005/0268112 A1 12/2005 Wang et al.
2005/0286423 A1 12/2005 Poletto et al.
2006/0018466 A1 1/2006 Adelstein et al.
2006/0075462 A1 4/2006 Golan
2006/0075492 A1 4/2006 Golan et al.
2006/0075500 A1 4/2006 Bertman et al.
2006/0107321 A1 5/2006 Tzadikario
2006/0126522 A1 6/2006 Oh
2006/0136720 A1 6/2006 Armstrong et al.
2006/0137009 A1 6/2006 Chesla
2006/0149848 A1 7/2006 Shay
2006/0156398 A1 7/2006 Ross et al.
2006/0161984 A1 7/2006 Phillips et al.
2006/0190803 A1 8/2006 Kawasaki et al.
2006/0191010 A1 8/2006 Benjamin
2006/0215627 A1 9/2006 Waxman
2006/0242694 A1 10/2006 Gold et al.
2006/0259967 A1 11/2006 Thomas et al.
2006/0282893 A1 12/2006 Wu et al.
2007/0011319 A1 1/2007 McClure et al.
2007/0072661 A1 3/2007 Lototski
2007/0073519 A1 3/2007 Long
2007/0116277 A1 5/2007 Ro et al.
2007/0124474 A1 5/2007 Margulis
2007/0198603 A1 8/2007 Tsioutsiouliklis et al.
2007/0201691 A1 8/2007 Kumagaya
2007/0201693 A1 8/2007 Ohno
2007/0218874 A1 9/2007 Sinha et al.
2007/0226796 A1 9/2007 Gilbert et al.
2007/0226802 A1 9/2007 Gopalan et al.
2007/0245420 A1 10/2007 Yong et al.
2007/0255724 A1 11/2007 Jung et al.
2007/0283166 A1 12/2007 Yami et al.
2008/0005782 A1 1/2008 Aziz
2008/0013725 A1 1/2008 Kobayashi
2008/0016339 A1 1/2008 Shukla
2008/0016570 A1 1/2008 Capalik
2008/0104046 A1 5/2008 Singla et al.
2008/0104703 A1 5/2008 Rihn et al.
2008/0134296 A1 6/2008 Amitai et al.
2008/0148381 A1 6/2008 Aaron
2008/0198005 A1 8/2008 Schulak et al.
2008/0244097 A1 10/2008 Candelore et al.
2008/0262991 A1 10/2008 Kapoor et al.
2008/0271143 A1 10/2008 Stephens et al.
2008/0285464 A1 11/2008 Katzir
2008/0301567 A1 12/2008 Martin et al.
2009/0007100 A1 1/2009 Field et al.
2009/0007220 A1 1/2009 Ormazabal et al.
2009/0115570 A1 5/2009 Cusack, Jr.
2009/0157574 A1 6/2009 Lee
2009/0164522 A1 6/2009 Fahey
2009/0193103 A1 7/2009 Small et al.
2009/0265777 A1 10/2009 Scott
2009/0320136 A1 12/2009 Lambert et al.
2010/0014594 A1 1/2010 Beheydt et al.
2010/0054241 A1 3/2010 Shah et al.
2010/0071063 A1 3/2010 Wang et al.
2010/0107257 A1 4/2010 Ollmann
2010/0146292 A1 6/2010 Shi et al.
2010/0146293 A1 6/2010 Shi et al.
2010/0146501 A1 6/2010 Wyatt et al.
2010/0162400 A1 6/2010 Feeney et al.

(56) References Cited

U.S. PATENT DOCUMENTS

2010/0197318 A1 8/2010 Petersen et al.
2010/0212013 A1 8/2010 Kim et al.
2010/0217861 A1 8/2010 Wu
2010/0235915 A1 9/2010 Memon et al.
2010/0268818 A1 10/2010 Richmond et al.
2010/0272257 A1 10/2010 Beals
2010/0278054 A1 11/2010 Dighe
2010/0280978 A1 11/2010 Shimada et al.
2010/0284282 A1 11/2010 Golic
2010/0299430 A1 11/2010 Powers et al.
2010/0319069 A1* 12/2010 Granstedt ........... H04L 63/0263 709/224
2011/0026521 A1 2/2011 Gamage et al.
2011/0035795 A1 2/2011 Shi
2011/0087779 A1 4/2011 Martin et al.
2011/0125770 A1 5/2011 Battestini et al.
2011/0135090 A1 6/2011 Chan et al.
2011/0138463 A1 6/2011 Kim et al.
2011/0153748 A1 6/2011 Lee et al.
2011/0185055 A1 7/2011 Nappier et al.
2011/0185421 A1 7/2011 Wittenstein et al.
2011/0214187 A1 9/2011 Wittenstein et al.
2011/0247071 A1 10/2011 Hooks et al.
2011/0265011 A1 10/2011 Taylor et al.
2011/0270957 A1 11/2011 Phan et al.
2011/0271343 A1 11/2011 Kim et al.
2011/0302653 A1 12/2011 Frantz et al.
2011/0317770 A1 12/2011 Lehtiniemi et al.
2012/0042060 A1 2/2012 Jackowski et al.
2012/0079596 A1 3/2012 Thomas et al.
2012/0102359 A1 4/2012 Hooks
2012/0136802 A1 5/2012 Mcquade et al.
2012/0137342 A1 5/2012 Hartrell et al.
2012/0143650 A1 6/2012 Crowley et al.
2012/0191660 A1 7/2012 Hoog
2012/0222120 A1 8/2012 Rim et al.
2012/0233311 A1 9/2012 Parker et al.
2012/0240185 A1 9/2012 Kapoor et al.
2012/0275505 A1 11/2012 Tzannes et al.
2012/0308008 A1 12/2012 Kondareddy et al.
2012/0331553 A1 12/2012 Aziz et al.
2013/0031037 A1 1/2013 Brandt et al.
2013/0031600 A1 1/2013 Luna et al.
2013/0061045 A1 3/2013 Kiefer et al.
2013/0083700 A1 4/2013 Sndhu et al.
2013/0097706 A1 4/2013 Titonis et al.
2013/0111211 A1 5/2013 Winslow et al.
2013/0196549 A1 8/2013 Sorani
2013/0298237 A1 11/2013 Smith
2013/0298243 A1 11/2013 Kumar et al.
2013/0333041 A1 12/2013 Christodorescu et al.
2014/0010367 A1 1/2014 Wang
2014/0013434 A1 1/2014 Ranum et al.
2014/0165207 A1 6/2014 Engel et al.
2014/0198669 A1 7/2014 Brown et al.
2014/0201776 A1 7/2014 Minemura et al.
2014/0215619 A1 7/2014 Lee et al.
2014/0230059 A1 8/2014 Wang
2014/0325643 A1 10/2014 Bart et al.
2015/0026810 A1 1/2015 Friedrichs et al.
2015/0032884 A1 1/2015 Greifender et al.
2015/0040219 A1 2/2015 Garraway et al.
2015/0047032 A1 2/2015 Hannis et al.
2015/0071308 A1 3/2015 Webb, III et al.
2015/0121461 A1 4/2015 Dulkin et al.
2015/0156270 A1 6/2015 Teraoka et al.
2015/0180883 A1 6/2015 Aktas et al.
2015/0195300 A1 7/2015 Adjaoute
2015/0207694 A1 7/2015 Inches et al.
2015/0264069 A1 9/2015 Beauchesne et al.
2015/0295903 A1 10/2015 Yi et al.
2015/0304346 A1 10/2015 Kim
2015/0324188 A1 11/2015 Raje et al.
2015/0341380 A1 11/2015 Heo et al.
2015/0341389 A1 11/2015 Kurakami
2015/0356451 A1 12/2015 Gupta et al.
2016/0021141 A1 1/2016 Liu et al.
2016/0028758 A1 1/2016 Ellis et al.
2016/0119292 A1 4/2016 Kaseda et al.
2016/0127390 A1 5/2016 Lai et al.
2016/0142746 A1 5/2016 Schuberth
2016/0191918 A1 6/2016 Lai et al.
2016/0234167 A1 8/2016 Engel et al.
2016/0247163 A1 8/2016 Donsky et al.
2016/0315954 A1 10/2016 Peterson et al.
2016/0323299 A1 11/2016 Huston, III
2016/0359895 A1 12/2016 Chiu et al.
2016/0366167 A1 12/2016 Yumer
2017/0007128 A1 1/2017 Takano et al.
2017/0026387 A1 1/2017 Vissamsetty et al.
2017/0026395 A1 1/2017 Mumcuoglu et al.
2017/0054744 A1 2/2017 Mumcuoglu et al.
2017/0063912 A1 3/2017 Sudhakar et al.
2017/0063921 A1 3/2017 Fridman et al.
2017/0078312 A1 3/2017 Yamada et al.
2017/0111376 A1 4/2017 Friedlander et al.
2017/0171229 A1 6/2017 Arzi et al.
2017/0171231 A1 6/2017 Reybok et al.
2017/0262633 A1 9/2017 Miserendino et al.
2017/0289178 A1 10/2017 Roundy et al.
2017/0294112 A1 10/2017 Kushnir
2017/0295190 A1 10/2017 Brown
2017/0374090 A1 12/2017 McGrew et al.
2018/0004948 A1 1/2018 Martin et al.
2018/0007013 A1 1/2018 Wang
2018/0048662 A1 2/2018 Jang et al.
2018/0075240 A1 3/2018 Chen
2018/0077189 A1 3/2018 Doppke et al.
2018/0121650 A1 5/2018 Brown
2018/0124077 A1 5/2018 Carver et al.
2018/0288081 A1 10/2018 Yermakov
2018/0332064 A1 11/2018 Harris et al.
2018/0365416 A1 12/2018 Monastyrsky et al.
2018/0373820 A1 12/2018 Knezevic et al.
2019/0036978 A1 1/2019 Shulman-Peleg et al.
2019/0044963 A1 2/2019 Rajasekharan et al.
2019/0044965 A1 2/2019 Pilkington et al.
2019/0065738 A1 2/2019 Kim et al.
2019/0068620 A1 2/2019 Avrahami et al.
2019/0075344 A1 3/2019 Brown
2019/0098025 A1 3/2019 Lim
2019/0207966 A1 7/2019 Vashisht et al.
2019/0268361 A1 8/2019 Blewett et al.
2019/0297097 A1 9/2019 Gong et al.
2019/0319981 A1 10/2019 Meshi et al.
2019/0334931 A1 10/2019 Arlitt et al.
2020/0007566 A1 1/2020 Wu
2020/0033144 A1 1/2020 Du et al.
2020/0065483 A1 2/2020 Mu et al.
2020/0082296 A1 3/2020 Fly et al.
2020/0136889 A1 4/2020 Chen et al.
2020/0137085 A1 4/2020 Kostyushko et al.
2020/0145435 A1 5/2020 Chiu et al.
2020/0162252 A1 5/2020 Davis et al.
2020/0162494 A1 5/2020 Rostami-Hesarsorkh
2020/0167491 A1 5/2020 Grabois et al.
2020/0193019 A1 6/2020 Tietz et al.
2020/0195673 A1 6/2020 Lee
2020/0244658 A1 7/2020 Meshi et al.
2020/0244675 A1 7/2020 Meshi et al.
2020/0244676 A1 7/2020 Amit et al.
2020/0244683 A1 7/2020 Meshi et al.
2020/0244684 A1 7/2020 Meshi et al.
2020/0274880 A1 8/2020 Badawy et al.
2020/0274894 A1 8/2020 Argoeti et al.
2020/0285737 A1 9/2020 Kraus et al.
2020/0293917 A1 9/2020 Wang et al.
2020/0314117 A1 10/2020 Nguyen et al.
2020/0327221 A1 10/2020 Street
2020/0327225 A1 10/2020 Nguyen et al.
2020/0342230 A1 10/2020 Tsai et al.
2020/0374301 A1 11/2020 Manevich et al.
2020/0404007 A1 12/2020 Singh et al.
2021/0004458 A1 1/2021 Edwards et al.

(56) References Cited

U.S. PATENT DOCUMENTS

| | | | |
|---|---|---|---|
| 2021/0064751 | A1 | 3/2021 | Li et al. |
| 2021/0084063 | A1 | 3/2021 | Triantafillos et al. |
| 2021/0176261 | A1 | 6/2021 | Yavo et al. |
| 2021/0182387 | A1 | 6/2021 | Zhu et al. |
| 2021/0209228 | A1 | 7/2021 | Maor et al. |
| 2021/0224676 | A1 | 7/2021 | Arzani et al. |
| 2021/0248503 | A1 | 8/2021 | Hickey et al. |
| 2021/0264028 | A1* | 8/2021 | Genc ..................... G06F 21/566 |
| 2021/0266339 | A1* | 8/2021 | Moshitzky .......... H04L 63/0254 |
| 2021/0273958 | A1 | 9/2021 | McLean |
| 2021/0286877 | A1 | 9/2021 | Vijayvargiya et al. |
| 2021/0304204 | A1 | 9/2021 | Ramesh et al. |
| 2021/0400070 | A1 | 12/2021 | Ackerman et al. |
| 2022/0086178 | A1* | 3/2022 | Jayamohan ......... G06F 9/45558 |
| 2022/0129551 | A1 | 4/2022 | Collier et al. |
| 2022/0138856 | A1 | 5/2022 | Ahlstrom et al. |
| 2022/0217156 | A1 | 7/2022 | Wahbo |
| 2022/0217166 | A1 | 7/2022 | Ladnai et al. |
| 2022/0263828 | A1 | 8/2022 | Brandel et al. |
| 2023/0007023 | A1 | 1/2023 | Andrabi et al. |
| 2023/0026385 | A1 | 1/2023 | Zhang et al. |
| 2023/0075355 | A1 | 3/2023 | Twigg et al. |
| 2023/0114821 | A1 | 4/2023 | Thomas et al. |
| 2023/0117120 | A1* | 4/2023 | Johnson ................ G06F 21/552 726/22 |
| 2023/0117268 | A1 | 4/2023 | Rimer et al. |
| 2023/0129144 | A1* | 4/2023 | Neil ...................... H04L 63/145 726/23 |
| 2023/0164039 | A1 | 5/2023 | Vadlamani |
| 2023/0164162 | A1 | 5/2023 | Lee et al. |
| 2023/0171235 | A1 | 6/2023 | Chhibber et al. |
| 2023/0224311 | A1 | 7/2023 | Meshi et al. |
| 2023/0229771 | A1* | 7/2023 | Gambhir Parekh .. G06F 21/566 726/24 |
| 2023/0247048 | A1 | 8/2023 | Samosseiko et al. |
| 2023/0269256 | A1 | 8/2023 | Allon et al. |
| 2023/0403294 | A1 | 12/2023 | Bazalgette et al. |
| 2024/0069948 | A1* | 2/2024 | Thomas .................. G06F 16/14 |
| 2024/0095350 | A1 | 3/2024 | Withnell et al. |
| 2024/0126910 | A1* | 4/2024 | Johnson ................ G06F 3/0482 |
| 2024/0211597 | A1 | 6/2024 | Loman et al. |
| 2024/0289461 | A1* | 8/2024 | Ko .......................... G06F 21/56 |
| 2024/0303529 | A1* | 9/2024 | Rane ...................... G06N 20/00 |
| 2024/0338489 | A1 | 10/2024 | Zhu et al. |
| 2024/0340306 | A1 | 10/2024 | Staab |
| 2024/0378423 | A1 | 11/2024 | Gunnai et al. |
| 2024/0380766 | A1* | 11/2024 | Shachar .................. H04L 63/20 |
| 2024/0386015 | A1 | 11/2024 | Crabtree et al. |
| 2024/0414178 | A1 | 12/2024 | Neuvirth-Telem et al. |
| 2025/0094585 | A1* | 3/2025 | Wuest .................... G06N 3/047 |
| 2025/0173431 | A1* | 5/2025 | Mon Divakaran ... G06F 21/552 |
| 2025/0181718 | A1 | 6/2025 | Saqib et al. |
| 2025/0217479 | A1 | 7/2025 | Palanki |
| 2025/0247402 | A1 | 7/2025 | Singla |
| 2025/0260712 | A1 | 8/2025 | Hong et al. |

FOREIGN PATENT DOCUMENTS

| | | | |
|---|---|---|---|
| CN | 101536455 | A | 9/2009 |
| CN | 103561048 | A | 2/2014 |
| CN | 106131050 | A | 11/2016 |
| CN | 114640507 | A | 6/2022 |
| CN | 109104395 | A | 8/2022 |
| CN | 115396324 | A | 11/2022 |
| CN | 116074031 | A | 5/2023 |
| EP | 0952521 | A2 | 10/1999 |
| EP | 2056559 | A1 | 5/2009 |
| GB | 0401420 | | 2/2004 |
| JP | 2004046742 | A | 2/2004 |
| JP | 2009111448 | A | 5/2009 |
| JP | 2021523451 | A | 9/2021 |
| WO | 03083660 | A1 | 10/2003 |
| WO | 2015149062 | A1 | 10/2015 |
| WO | 2020100284 | A1 | 5/2020 |

OTHER PUBLICATIONS

Ku, "Correlation Analysis of Intrusion Alerts," Dissertation in Computer Science submitted to the Graduate Faculty, North Carolina State University, pp. 1-206, year 2006.
Brownlee et al., "Traffic Flow Measurement: Architecture," Request for Comments 2722, Network Working Group, pp. 1-48, Oct. 1999.
U.S. Appl. No. 17/571,558 Office Action dated Jun. 26, 2023.
Palo Alto Networks, Inc., "Cortex Xsoar—Redefining Security Orchestration and Automation," product Information, pp. 1-2, year 2020.
De Leon, U.S. Appl. No. 18/322,231, filed May 23, 2023.
Newman et al., U.S. Appl. No. 18/357,121, filed Jul. 23, 2023.
U.S. Appl. No. 17/505,673 Office Action dated Sep. 25, 2023.
U.S. Appl. No. 17/700,579 Office Action dated Oct. 13, 2023.
AU Application # 2021351215 Office Action dated Nov. 28, 2023.
AU Application # 2022370400 Office Action dated Jun. 12, 2024.
International Application # PCT/IB2024/052646 Search Report dated Jun. 14, 2024.
U.S. Appl. No. 17/676,275 Office Action dated Sep. 6, 2024.
Du et al., "AutoCombo: Automatic Malware Signature Generation Through Combination Rule Mining," Proceedings of CIKM '21, Virtual Event, Association for Computing Machinery, pp. 1-10, Nov. 2021.
Dropzone AI, "10X SOC Team Multiplier," AI Solutions Guide, pp. 1-4, year 2024, as downloaded from https://www.dropzone.ai/solution-sheets/dropzone-ai-solution-guide.
Dijkstra, "A Note on Two Problems in Connexion with Graphs," Numerische Mathematik 1, pp. 269-271, year 1959.
"PA-3250 Next Generation Firewall," PS-3200 Series, Datasheet, Palo Alto Networks, Inc., Santa Clara, CA, USA, pp. 1-4, year 2021.
"What is PCI DSS?" Palo Alto Networks, Cyberpedia, pp. 1-5, year 2021, as downloaded from https://www.paloaltonetworks.com/cyberpedia/what-is-a-pci-dss.
Wikipedia, "Active Directory," pp. 1-14, last edited Oct. 2021.
Asrigo et al., "Using VMM-based sensors to monitor honeypots," Proceedings of the 2nd International Conference on Virtual Execution Environments, pp. 13-23, Jun. 14, 2006.
Bhuyan et al., "Surveying Port Scans and Their Detection Methodologies", Computer Journal, vol. 54, No. 10. pp. 1565-1581, Apr. 20, 2011.
Skormin, "Anomaly-Based Intrusion Detection Systems Utilizing System Call Data", Watson School of Engineering at Binghamton University, pp. 1-82, Mar. 1, 2012.
Palo Alto Networks, "Cortex XDR", datasheet, pp. 1-7, year 2020.
Palo Alto Networks, "WildFire", datasheet, pp. 1-6, year 2020.
Barford et al., "Characteristics of Network Traffic Flow Anomalies," Proceedings of the 1st ACM SIGCOMM Workshop on Internet Measurement, pp. 69-73, year 2001.
Light Cyber Ltd, "LightCyber Magna", pp. 1-3, year 2011.
Tier-3 Pty Ltd, "Huntsman Protector 360", Brochure, pp. 1-2, Apr. 1, 2010.
Tier-3 Pty Ltd, "Huntsman 5.7 The Power of 2", Brochure, pp. 1-2, Oct. 8, 2012.
Bilge et at., "Disclosure: Detecting Botnet Command and Control Servers Through Large-Scale NetFlow Analysis", ACSAC, pp. 1-10, Dec. 3-7, 2012.
Blum., "Combining Labeled and Unlabeled Data with Co-Training", Carnegie Mellon University, Research Showcase @ CMU, Computer Science Department, pp. 1-11, Jul. 1998.
Felegyhazi et al., "On the Potential of Proactive Domain Blacklisting", LEET'10 Proceedings of the 3rd USENIX Conference on Large-scale exploits and emergent threats, pp. 1-8, San Jose, USA, Apr. 27, 2010.
Frosch., "Mining DNS-related Data for Suspicious Features", Ruhr Universitat Bochum, Master'sThesis, pp. 1-88, Dec. 23, 2011.
Bilge at al., "Exposure: Finding Malicious Domains Using Passive DNS Analysis", NDSS Symposium, pp. 1-17, Feb. 6-9, 2011.
Gross et al., "Fire: Finding Rogue Networks", Annual Conference on Computer Security Applications (ACSAC'09), pp. 1-10, Dec. 7-11, 2009.

(56) References Cited

OTHER PUBLICATIONS

Markowitz, N., "Bullet Proof Hosting: A Theoretical Model", Security Week, [pp. 1-5, Jun. 29, 2010, downloaded from http://www.infosecisland.com/blogview/4487-Bullet-Proof-Hosting-A-Theoretical-Model.html.
Konte et al., "ASwatch: An AS Reputation System to Expose Bulletproof Hosting ASes", SIGCOMM, pp. 625-638, Aug. 17-21, 2015.
Markowitz, N., "Patterns of Use and Abuse with IP Addresses", Security Week, pp. 1-4, Jul. 10, 2010, downloaded from http://infosecisland.com/blogview/5068-Patterns-of-Use-and-Abuse-with-IP-Addresses.html.
Wei et al., "Identifying New Spam Domains by Hosting IPs: Improving Domain Blacklisting", Department of Computer and Information Sciences, University of Alabama at Birmingham, USA, pp. 1-8, Dec. 8, 2010.
Goncharov, M., "Criminal Hideouts for Lease: Bulletproof Hosting Services", Forward-Looking Threat Research (FTR) Team, A TrendLabsSM Research Paper, pp. 1-28, Jul. 3, 2015.
Yifan Tian, "CNN-Webshell" Malicious Web Shell Detection with Convolutional Neural Network, ACM, pp. 75-79, year 2017.
U.S. Appl. No. 17/676,275 Office Action dated Jun. 16, 2025.
U.S. Appl. No. 18/357,121 Office Action dated May 2, 2025.
Khosravi et al, "Alerts Correlation and Causal Analysis for APT Based Cyber Attack Detection," IEE Access, vol. 8, pp. 162642-162656, year 2020.
U.S. Appl. No. 18/322,231 Office Action dated Mar. 26, 2025.
Final Office Action for U.S. Appl. No. 18/357,121, dated Oct. 23, 2025.
Notice of References Cited for U.S. Appl. No. 18/357,121, dated Oct. 23, 2025.
Non-Final Office Action for U.S. Appl. No. 18/661,626, dated Oct. 1, 2025.
Notice of References Cited for U.S. Appl. No. 18/661,626, dated Oct. 1, 2025.
Non-Final Office Action for U.S. Appl. No. 18/783,523, dated Oct. 21, 2025.
Notice of References Cited for U.S. Appl. No. 18/783,523, dated Oct. 21, 2025.
Non-Final Office Action for U.S. Appl. No. 18/731,420, dated Oct. 2, 2025.
Notice of References Cited for U.S. Appl. No. 18/731,420, dated Oct. 2, 2025.
Australian Application No. 2022441431, Examination report No. 1 dated Jul. 3, 2025.
First Office Action, Chinese Application No. 202310649492.6, dated Jul. 24, 2025.
Decision on Appeal (Appeal 2024-003437) for U.S. Appl. No. 17/700,579, dated Jul. 30, 2025.
Non-Final Office Action for U.S. Appl. No. 18/499,256, dated Aug. 18, 2025.
Non-Final Office Action for U.S. Appl. No. 18/322,231, dated Sep. 30, 2025.
Notice of References Cited for U.S. Appl. No. 18/322,231, dated Sep. 30, 2025.
Japanese Office Action, Japanese Patent Application No. 2024-505476, dated Feb. 3, 2026.

* cited by examiner

NETWORK ALERT ENRICHMENT

FIELD OF THE INVENTION

The present invention relates generally to computer security, and particularly identifying a process executing on a host computer and responsible for malicious activity.

BACKGROUND OF THE INVENTION

In many computers and network systems, multiple layers of security apparatus and software are deployed in order to detect and repel the ever-growing range of security threats. At the most basic level, computers use anti-virus software to prevent malicious software from running on the computer. At the network level, intrusion detection and prevention systems analyze and control network traffic to detect and prevent malware from spreading through the network.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method including collecting, during a time period from security agents executing on respective host computers, reports of communication events, each of the communication events including communication activity performed by a process having a respective process identifier (ID) and executing on one of the host computers, generating, from each of the collected reports, a set of features including characteristics of the communication activity and the respective process ID, training, by a processor, a model for identifying, based on the features of one or more of the events, the process ID of one of the processes performing the one or more of the events, receiving, from a network management device subsequent to the time period, an alert indicating malicious activity and referencing one or more reports of additional communication events performed by a given host computer, applying the model to the one or more reports of additional communication events so as to identify, on the given host computer, a given process ID of a given process responsible for the alert, and initiating a protective action with respect to at least the given process executing on the given host computer.

In one embodiment, the network management device includes a firewall.

In another embodiment, generating a given feature includes extracting a given feature from a given collected report.

In an additional embodiment, generating a given feature includes normalizing the extracted given feature.

In a further embodiment, generating a given feature includes computing the given feature based on one or more of the extracted features.

In a first feature embodiment, a given feature includes a domain.

In a second feature embodiment, a given feature includes an Internet Protocol (IP) address.

In some embodiments, a given feature indicates whether or not the IP address includes an Autonomous System Number (ASN).

In a third feature embodiment, a given feature includes a JA3 fingerprint.

In a fourth feature embodiment, a given feature includes a JA3S fingerprint.

In a fifth feature embodiment, a given feature includes a Server Name Indication (SNI) hostname.

In a sixth feature embodiment, a given feature includes the given process identifier.

In a seventh feature embodiment, a given feature includes a logical port number.

In an eighth feature embodiment, a given feature includes the process ID.

In a ninth feature embodiment, a given feature includes one or more network protocols used in the communication activity.

The method according to claim 1, wherein applying the model includes generating additional features from the one or more additional communication events, and applying the model to the additional features.

In another embodiment, the host computers include first host computers, and the given host computer includes an additional host computer different from any of the first host computers.

In an additional embodiment, initiating the protective with respect to a given process includes isolating the given process.

In a further embodiment, initiating the protective with respect to a given process includes presenting, on a display, details of the given process.

In a supplemental embodiment, receiving the alert includes receiving a given report for a specific communication event.

There is also provided, in accordance with an embodiment of the present invention, an apparatus including a memory configured to store a model, and a processor configured to collect, during a time period from security agents executing on respective host computers, reports of communication events, each of the communication events including communication activity performed by a process having a respective process ID and executing on one of the host computers, to generate, from each of the collected reports, a set of features including characteristics of the communication activity and the respective process ID, to train the model to identify, based on the features of one or more of the events, the process ID of one of the processes performing the one or more of the events, to receive, from a network management device subsequent to the time period, an alert indicating malicious activity and referencing one or more reports of additional communication events performed by a given host computer, to apply the model to the one or more reports of additional communication events so as to identify, on the given host computer, a given process ID of a given process responsible for the alert, and to initiate a protective action with respect to at least the given process executing on the given host computer.

There is additionally provided, in accordance with an embodiment of the present invention, a computer software product for protecting a computing device, which includes a processor and a memory and is coupled to a storage device storing a set of one or more software product including a non-transitory computer-readable medium, in which program instructions are stored, which instructions, when read by a computer, cause the computer to collect, during a time period from security agents executing on respective host computers, reports of communication events, each of the communication events including communication activity performed by a process having a respective process ID and executing on one of the host computers, to generate, from each of the collected reports, a set of features including characteristics of the communication activity and the respective process ID, to train a model for identifying, based on the features of one or more of the events, the process ID of one of the processes performing the one or more of the events, to receive, from a network management device subsequent to the time period, an alert indicating malicious activity and referencing one or more reports of additional communication events performed by a given host computer, to apply the model to the one or more reports of additional communication events so as to identify, on the given host computer, a given process ID of a given process responsible for the alert, and to initiate a protective action with respect to at least the given process executing on the given host computer.

BRIEF DESCRIPTION OF THE DRAWINGS

The disclosure is herein described, by way of example only, with reference to the accompanying drawings, wherein.

DETAILED DESCRIPTION OF EMBODIMENTS

Different networks can deploy different types of security systems for detecting malicious activity (e.g., transmissions) on the network. A first type of security system can be installed on a network management device that manages data traffic between endpoints on the network, and a second type of security system can be installed on security agents executing on the endpoints themselves.

While the first type of security system typically requires less resources to manage than the second type of security system, it is typically limited to identifying endpoints generating malicious data traffic. On the other hand, while the second type of system is typically more costly and requires more management, it typically can identify any processes on any endpoint performing malicious activity.

Embodiments of the present invention provide methods and systems for a security server to implement a machine learning model that can enrich alerts received from a network management device (e.g., a firewall) with information gleaned from security agents. In embodiments described hereinbelow, the security server can enrich these alerts by identifying a given software process that is executing on a host computer and performing communication activity that triggered the alert.

As described hereinbelow, during a time period (e.g., a training period) reports of communication events are collected from security agents executing on respective host computers, each of the communication events comprising communication activity performed by a process having a respective process identifier (ID) and executing on one of the host computers. Respective sets of features comprising characteristics of the communication activity and the respective process ID are generated from the collected reports, and the generated features are used to train a model for identifying the process ID of one of the processes performing the one or more of the events based on the features of one or more of the events.

Subsequent to the time period (e.g., during production), an alert is received from a network management device, the alert indicating malicious activity and referencing one or more reports of additional communication events performed by a given host computer. Upon receiving the alert, the model is applied to the one or more reports of additional communication events so as to identify, on the given host computer, a given process ID of a given process responsible for the alert. Finally, a protective action is initiated with respect to at least the given process executing on the given host computer and having the given process ID.

SYSTEM DESCRIPTION

Figure 1:
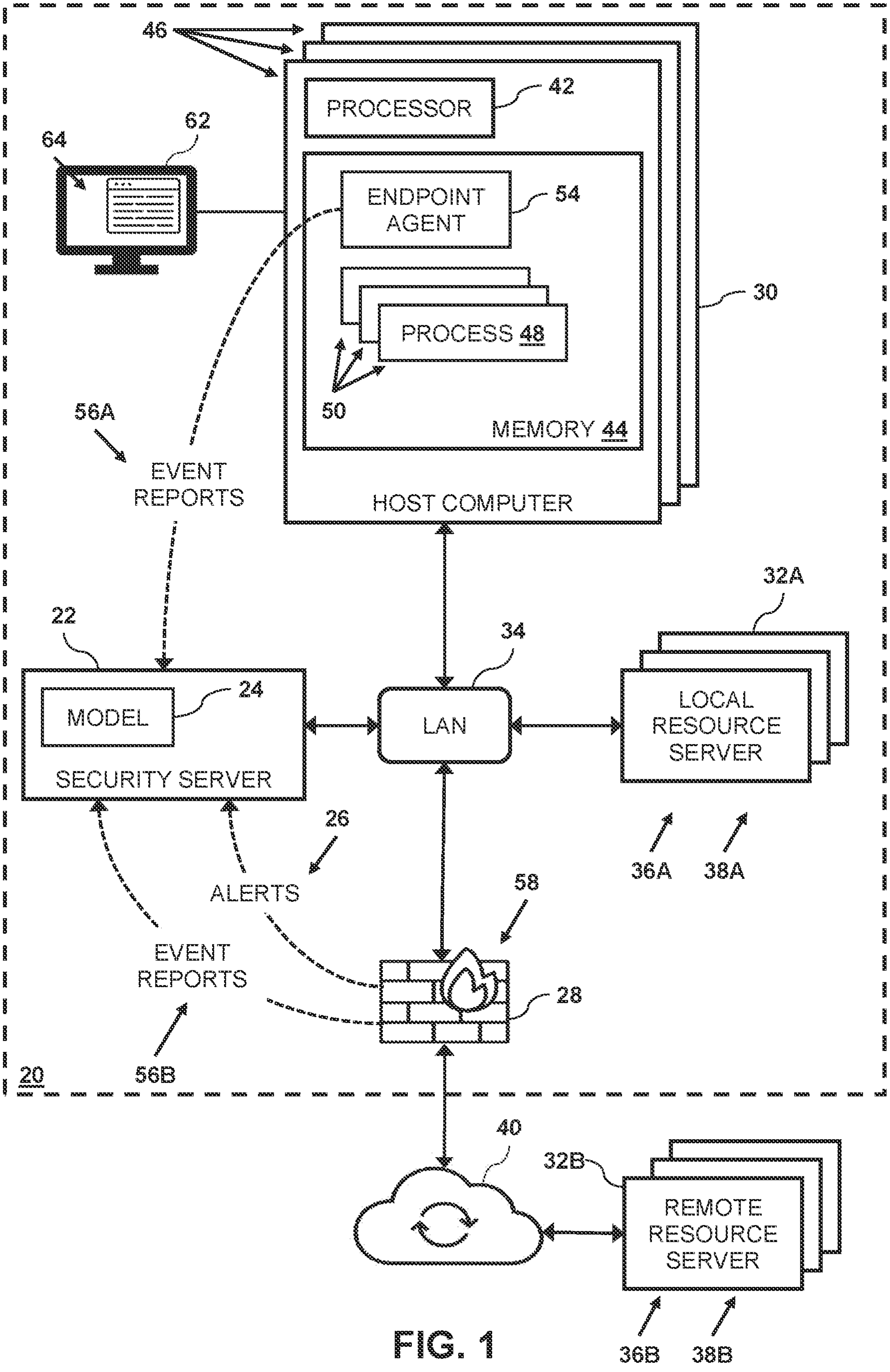
FIG. 1 is a block diagram showing an example of a computing facility comprising a security server that can execute a machine learning model that is configured to enrich alerts received from a network management device, in accordance with an embodiment of the present invention.

FIG. 1 is a block diagram that shows an example of a computing facility 20 comprising a security server 22 that executes an alert enrichment model 24 that is configured to enrich alerts 26 generated by a network management device such as a firewall 28, in accordance with an embodiment of the present invention.

In the configuration shown in FIG. 1, security server 22 can communicate with one or more host computers 30 and one or more resource servers 32 via a data network such as local area network (LAN) 34. In embodiments herein alerts 26 comprise reports of suspected malicious activity initiated by one or more host computers 30 and/or one or more resource servers 32.

In some embodiments, resource servers 32 comprise (i.e., can be referenced by or accessed via) respective domains 36, and the resource servers comprise respective Internet Protocol (IP) addresses 38. Resource servers can host, e.g., for computers 30, one or more web-based applications and/or provide network services such as database management systems.

LAN 34 is also coupled to a network management device such as firewall 28 that controls and monitors traffic between LAN 34 and a public network such as Internet 40, and can generate one or more alerts 26 upon detecting malicious traffic on LAN 34 and/or received from Internet 40. One example of firewall 28 is a PA-3250 NEXT GENERATION FIREWALL™ produced by PALO ALTO NETWORKS, INC. of 3000 Tannery Way, Santa Clara, CA 95054 USA.

In embodiments described herein, resource servers 32, domains 36 and IP addresses 38 can be differentiated by appending a letter to the identifying numeral, so that the resource servers comprise local resource servers 32A and remote resource servers 32B, the domains comprise domains 36A and 36B, and the IP addresses comprise addresses and 38A 38B. In the configuration shown in FIG. 1:

- Resource servers 32A are coupled to LAN 34 and comprise respective domains 36A and IP addresses 38A.
- Resource servers 32B are accessible to host computers 30 via Internet 40 and comprise respective domains 36B and IP addresses 38B.

Each given host computer 30 may comprise a host processor 42 and a host memory 44. Each host computer 30 comprises (i.e., can be referenced by) a unique host identifier (ID) 46 such as an Internet Protocol (IP) address or a Media Access Control (MAC) address.

In the configuration shown in FIG. 1, processor 42 executes, from memory 44, a set of processes 48 (i.e., memory 44 stores 48) having respective process identifiers (IDs) 50. In some embodiments, process IDs 50 comprise unique identifiers or process names for processes 48.

Examples of process IDs 50 include, but are not limited to names of operating systems (e.g., WINDOWS™, produced by MICROSOFT CORPORATION, Redmond, Washington) and names of software applications (e.g., POWERSHELL™, CMD™, WORD™ OUTLOOK™ and EXCEL™, also produced by MICROSOFT CORPORATION).

Each given processor 42 may execute, from its respective memory 44, a respective instance of an endpoint security agent 54 (which may also be referred to herein as endpoint agent 54, security agent 54 or agent 54). One example of a given endpoint agent 54 is CORTEX EXTENDED DETECTION AND RESPONSE™ (XDR™), produced by PALO ALTO NETWORKS INC.

In embodiments described herein, endpoint agents 54 and firewall 28 can convey event that be reports 56 can differentiated by appending a letter to the identifying numeral, so that the event reports comprise event reports 56A generated and conveyed by endpoint security agents 54 and event reports 56B generated and conveyed by firewall 28. Event reports 56 provides information on communication activity on LAN 34 as follows:

Each given endpoint agent 54 executing on a given host computer 30 generates event reports 56A that provide information on communication activities performed by the given host computer. Since the endpoint agents execute on the host computers, each given event report 56A for a given communication activity can reference a given process 48 (e.g., by its respective process ID 50). Additionally, while endpoint agents 54 can generate event reports 56A that provide information of other types of activities (e.g., initiating or terminating a given process 48), embodiments of the present invention can be restricted to event reports 56A that provide information on communication activities.

Firewall 28 executes network device logic 58 that analyzes communication activities comprising data traffic to/from host computers 30 and resource servers 32A, and generates event reports 56B in response to the communication activities. For example, a given event report 56 (i.e., either 56A or 56B) may comprise a given host computer 30 transmitting a specific number of bytes to a given remote server 32B.

In embodiments of the present invention, event reports 56 typically reference communication activity typically comprise communicating between host computers 30 (or any computing devices behind firewall 28 and remote resource servers 32B (or any computing devices outside the firewall). Therefore, a given event report 56 may reference a given host computer 30 transmitting data to a given remote resource server 32B or a given host computer 30 receiving data from a given remote resource server 32B.

While the configuration in FIG. 1 shows firewall 28 executing network device logic 58, configurations where the network device logic executes on any other device such as given host computer 30 or a given server 32A are considered to be within the spirit and scope of the present invention.

In some embodiments, a given host computer 30 may comprise a display 62, and processor 42 can present, on the display, a rendering 64 comprising the alert context information, as described hereinbelow.

Figure 2:
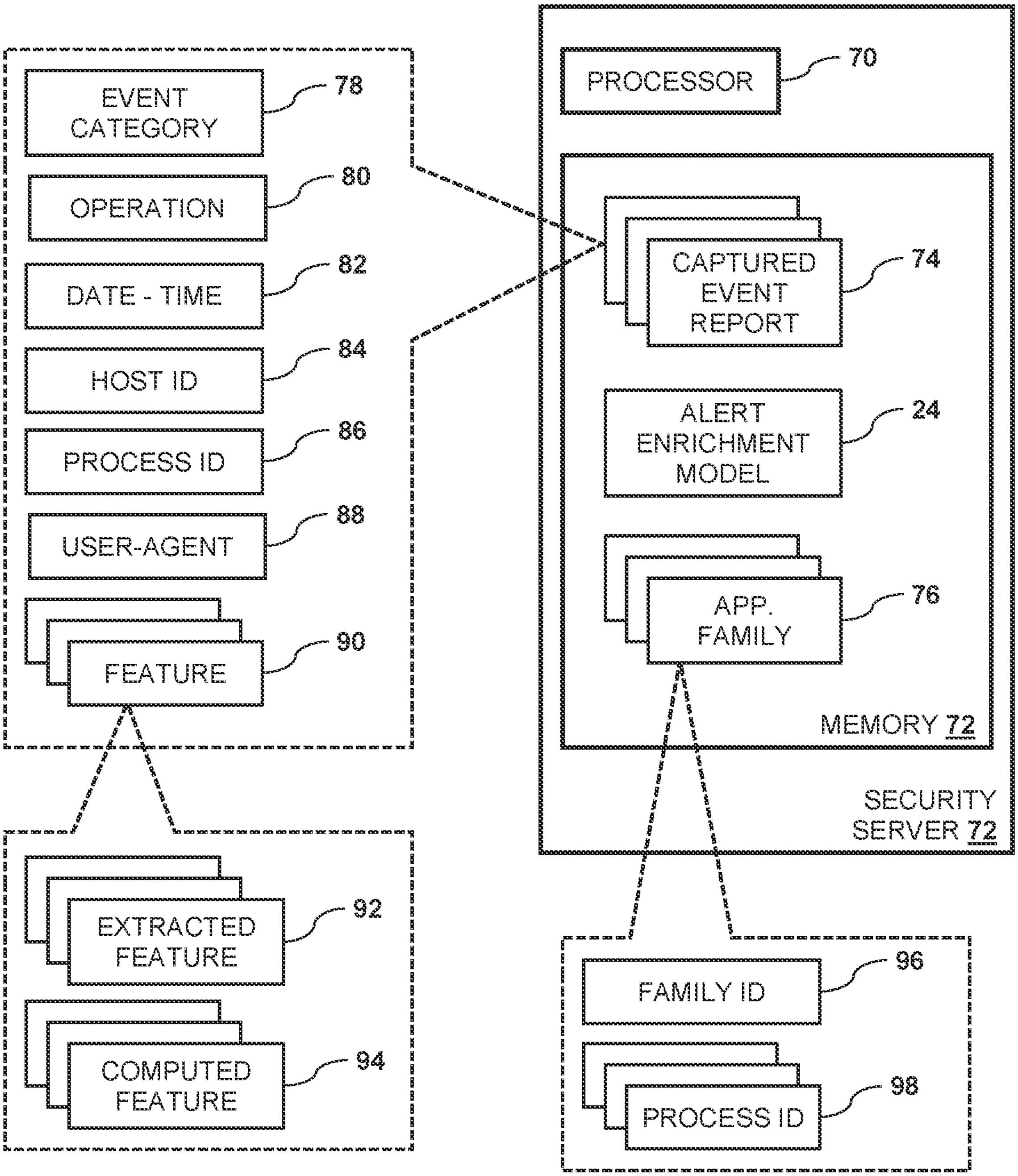
FIG. 2 is a block diagram that shows an example of a configuration of the security server, in accordance with an embodiment of the present invention.

FIG. 2 is a block diagram that shows hardware and software components of security server 22, in accordance with an embodiment of the present invention. In the configuration shown in FIG. 2, security server 22 comprises a security processor 70 and a security memory 72 that comprises alert enrichment model 24, a set of captured event reports 74, and a set of application families 76.

Each given captured event report 74 corresponds to a given event report 56, and can include activity (i.e., event) information such as:

- An event category 78 that can be used to classify the activity performed by a given process 48 executing on a given host computer 30. Examples of event categories 78 include but are not limited to communication activity (e.g., transmitting data), file activity (e.g., accessing a file) and process activity (e.g., initiating execution of a given process 48).
- An operation 80 indicating details of the activity. Examples of operations 80 include a file upload or transmitting a Hypertext Transfer Protocol (HTTP) request.
- A date and time 82 of the activity.
- A host ID 84 comprising (i.e., storing) a given host ID 46 referencing a given host computer 30 that performed the action.
- A process ID 86 referencing a given process 48 that performed the action while executing on the given host computer. In embodiments described herein, processor 70 can extract process ID 86 (typically only) from event reports 56A.
- A user-agent 88 that comprises information such as an operating system ID (e.g., WINDOWS™) executing on a given host computer 30 that generated the given captured event report and a given process ID 86 of a software application (not shown) that is executing on the given host computer and performed the operation in the given captured event report. For example, the given process ID can reference a web browser such as CHROME™ (produced by ALPHABET INC., 1600 Amphitheatre Parkway, Mountain View, CA 94043, USA).
- A set of features 90 comprising characteristics of the action. Features 90 comprise extracted features 92 that processor 70 can extract from the given event reports, and computed features 94 that comprise statistical values that the server processor can compute based on the extracted features.

Examples of extracted features 92 that processor 70 can extract from a given event report 56 for a given communication session managed by a given process 48 include, but are not limited to:

- A given domain 36 accessed in the given communication session. In some embodiments, processor 70 can normalize the given domain by identifying a root domain for the given domain, and use the normalized root domain as a given feature 90.
- A given IP address 38 accessed in the given communication session.
- An indication of whether or not the given IP address comprises an Autonomous System Number (ASN).
- A JA3 fingerprint comprising a fingerprint of Secure Socket Layer (SSL)/Transport Layer Security (TLS) negotiation between a given host computer 30 (i.e., the client) and a given server 32. In some embodiments, processor 70 can normalize the given JA3 fingerprint, and use the normalized JA3 fingerprint as a given feature 90.
- A JA3S fingerprint comprising a server-side fingerprint of Secure Socket Layer (SSL)/Transport Layer Security (TLS) negotiation between a given host computer 30 (i.e., the client) and a given server 32 during a response from the given server. In some embodiments, processor 70 can normalize the given JA3S fingerprint, and use the normalized JA3S fingerprint as a given feature 90.

- A Server Name Indication (SNI) indicating a hostname (i.e., referencing a given host computer 30 or a given server) to which the given communication session is attempting to connect at the start of the handshaking process.
- A given process ID 86 for a software application (e.g., WORD or EXCEL) referenced by the process ID of the given process that performed the given communication session. In one embodiment, process ID 86 is provided by a given event report 56A. In another embodiment, process ID 86 can be computed (i.e. "predicted") by model 24 using embodiments described herein.
- A sequence of one or more network protocols used in the given communication session. In some embodiments each of the network protocols may have a specific purpose (i.e., for a specific service), such as web browsing. Examples of these network protocols are described hereinbelow.
- A logical communication port number accessed in the given communication session.
- A duration of the given communication session.
- An amount of data transmitted and/or received in the given communication session.

Examples of computed features 94 include, but are not limited to:

- A count of how many endpoint agents reported a given communication session accessing a given domain 36.
- A count of how many endpoint agents reported a given communication session accessing a given IP address 38.
- A count of how many endpoint agents reported a given communication session comprising a given JA3 fingerprint.

In some embodiments, a given process ID 86 may referencing a software application belong a single family of applications (e.g., OFFICE™ produced by MICROSOFT CORPORATION), and therefore exhibit similar characteristics when executing on a given processor 42. In these embodiments, each application family 76 may comprise a family ID 98 and a plurality of process IDs 98 referencing the software applications in the family. For example, a given process ID 98 may be shared among OFFICE™ applications whose respective process IDs 98 reference WORD™, OUTLOOK™ and EXCEL™. In one family embodiment, processor 70 can identify the applications referenced by process IDs 98 by detecting a shared common path "\Program Files \Microsoft Office" for the identified applications. In another family embodiment, processor 70 can identify the applications referenced by process IDs 98 by detecting any identical domains or IP addresses accessed by the applications.

Processors 42 and 70 comprise general-purpose central processing units (CPU) or special-purpose embedded processors, which are programmed in software or firmware to carry out the functions described herein. This software may be downloaded to security server 22 and host computers 30 in electronic form, over a network, for example. Additionally or alternatively, the software may be stored on tangible, non-transitory computer-readable media, such as optical, magnetic, or electronic memory media. Further additionally or alternatively, at least some of the functions of processors 42 and 70 may be carried out by hard-wired or programmable digital logic circuits.

Examples of memories 44 and 72 include dynamic random-access memories, non-volatile random-access memories, hard disk drives and solid-state disk drives.

In some embodiments, tasks described herein performed by processors 42, 70 and network device logic 58 may be split among multiple physical and/or virtual computing devices. In other embodiments, these tasks may be performed in a managed cloud service.

Network Management Device Alert Enrichment

Figure 3:
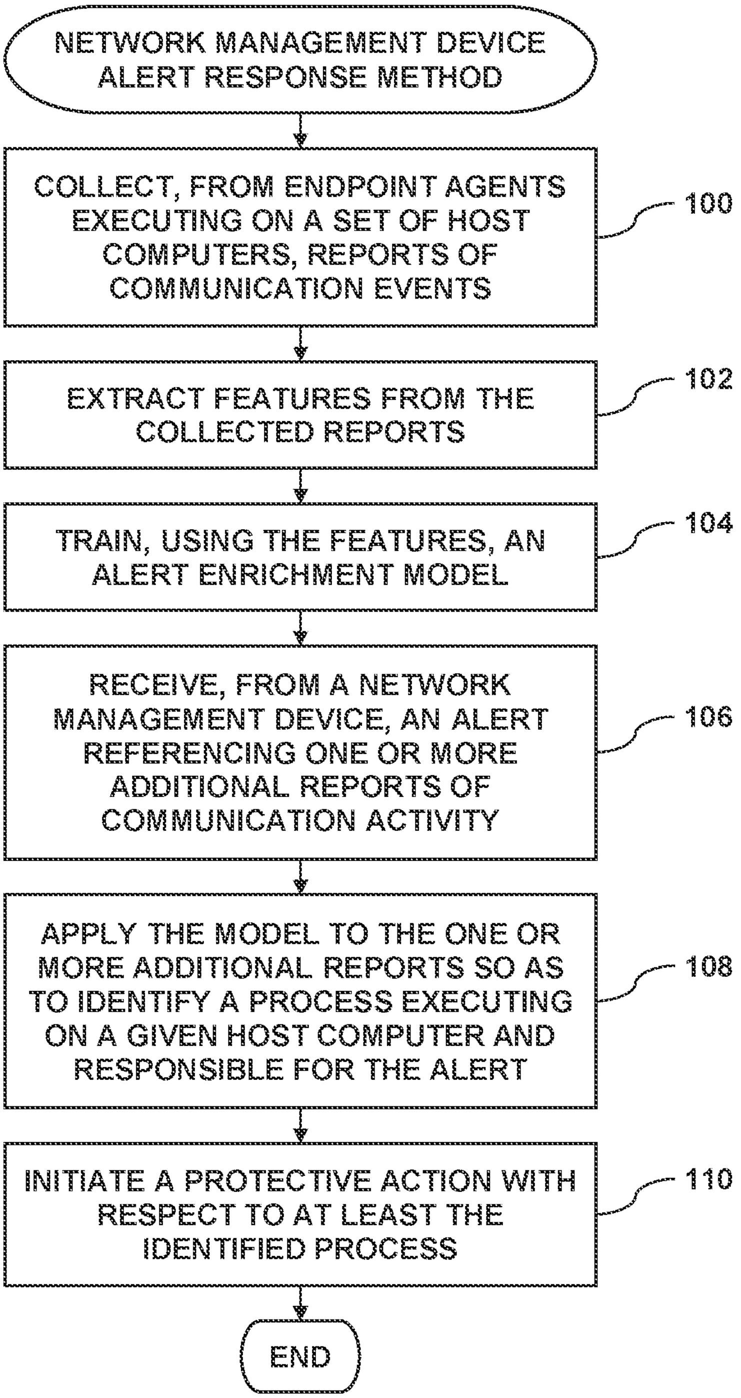
FIG. 3 is a flow diagram that schematically illustrates a method of enriching a detected alert and performing a protective action in response to the alert, in accordance with an embodiment of the present invention.

FIG. 3 is a flow diagram that schematically illustrates a method of selecting and performing a protective action in response to detecting a given alert 26, in accordance with an9 embodiment of the present invention.

In step 100, processor 70 collects, during a time period (i.e., a training period), event reports 56B from endpoint agents 54. As described supra, each report 56B references a communication event comprising communication activity performed by a given process 48 having one of process IDs 50.

In step 102, processor 70 generates features 90 by extracting features 92 from the collected events and the collected process ID, and computing features 94 based on extracted features 92. The following are examples of information that can be stored to two different captured event reports (i.e., for two different communication events.

In the first example (i.e., for a first given communication session:

- Family ID 96: system.
- A first given feature 92 referencing the network protocols in the communication session: ip, tcp, ssh
- Process ID 86: ssh
- A second given feature 92 referencing the logical communication port number accessed in the communication session: 53.
- The operating system ID for user-agent 88: WINDOWS™
- Domain 36: notsafe.com
- IP address 38: 1.2.3.4
- Operation 80: Uncommon network tunnel creation
- User-agent 88: Mozilla/5.0 (Windows NT 10.0; Win64; x64) AppleWebKit/537.36 (KHTML, like Gecko) Evernote/10.51.7 Chrome/102.0.5005.167 Electron/19.1.8 Safari/537.36.
- A third given feature 92 referencing the SNI in the communication session: notsafe.com.
- A third given feature 92 referencing the JA3 fingerprint in the communication session: b32309a26951912be7dba376398abc3b.
- A fourth given feature 92 referencing the JA3S fingerprint in the communication session: 6da3d3d0a98c7d4d4822c1f2429a720b In the second example (i.e., for a second given communication session:

- Family ID 96: browser.
- A first given feature 92 referencing the network protocols in the communication session: ip, tcp, boxnet-base.
- Process ID 86: CHROME™
- A second given feature 92 referencing the logical communication port number accessed in the communication session: 443.
- The operating system ID for user-agent 88: WINDOWS™
- Domain 36: app.box.com
- IP address 38: 5.6.7.8.
- Operation 80: A user accessed an uncommon external file-sharing service
- User-agent 88: Microsoft-CryptoAPI/10.0.
- A third given feature 92 referencing the SNI in the communication session: app.box.com.

A third given feature 92 referencing the JA3 the communication session: fingerprint in 9c29c3d400525d0f8afd693d67295de7

A fourth given feature 92 referencing the JA3S fingerprint in the communication session: 16c0b3e6a7b8173c16d944cfeaeee9cf In step 104, processor 70 trains model 24 with process IDs 86 and features 90. In embodiments herein, model 24 comprises a machine learning model that can identify, based on features 90 generated for a given event report 56, a given process ID 50 for a given process 48 that performed a given communication event corresponding to the given event report.

In some embodiments, processor 70 can also use other information stored in the captured event reports (e.g., event category 78, operation 80, date and time 82, host ID 84, user-agent 88) to train model 24. In these embodiments, all the information stored in the captured event reports may be referred to collectively as features 90.

In step 106, at a time subsequent to the time period (e.g., during production subsequent to the training period), processor 70 receives, from network device logic 58, a new alert 26 indicating malicious activity performed by a given host computer 30 and referencing one or more event reports 56B. In one embodiment, a given endpoint agent 54 can analyze the communication events in communication event reports 56A that were generated by the given endpoint agent, detect suspected malicious activity in on or more of the communication events (i.e., a single communication event or a sequence of multiple communication events), and generate an alert for the detected suspicious malicious activity. Likewise, firewall 28 can analyze the communication events in communication event reports 56A that were generated by the firewall, detect suspected malicious activity in on or more of the communication events, and generate an alert for the detected suspicious malicious activity.

Upon receiving the new alert, processor 70 collects the referenced event reports 56B (that reference respective communication events comprising communication activity performed by the given host computer), and generates additional features 90 from the referenced one or more event reports 56B.

In step 108, processor 70 applies model 24 to the one or more referenced event reports (including the additional features generated from the one or more referenced event reports) so as to identify, on the given host computer, the process ID(s) of one or more processes 48 on the given host computer that performed the communication activity referenced by the one or more event reports 56B, and are therefore responsible for the received alert. Using model 24 to identify the one or more processes is described hereinbelow.

Finally, in step 110, processor 70 initiates a protective action with respect to at least the identified one or more processes, and the method ends. In one protective action embodiment, processor 70 can initiate the protective action by performing an isolation action (e.g., terminating, quarantining or removing) on the identified one or more processes or on the host computer executing the identified one or more processes. To identify the given process, model 24 can identify a given process ID 50, and processor 70 can convey, to the given host computer a request to perform the protective action on any processes 48 executing on the given host computer and whose respective process ID(s) 50 matches the given process ID 50 (i.e., the output of model 24).

In another protective action embodiment, processor 70 can initiate the protective action by presenting, to a security operations center (SOC) analyst (not shown), details (e.g., the process ID) of the identified one or more processes in rendering 64 on display 62. In this embodiment, rendering 64 provides the SOC analyst with context for the received alert, thereby enabling the SOC analyst to formulate an effective response.

While the embodiments describe supra describe identifying a given process 48 on a given host computer 30, using these embodiments to identify processes 48 on other computing devices is considered to be with the spirit and scope of the present invention. In one example, processor 70 can use embodiments described herein to identify a given process 48 executing on a given server 32A. In another example, model 24 can be deployed on a different security server 22 that protects, using embodiments described hereinabove, computing devices (e.g., host computers and/or server computers) in a different computing facility.

In some embodiments, identifying the one or more processes (i.e., in the description referencing step 108 hereinabove) may comprise identifying a chain of processes 48 ending with a given process 48 responsible for the alert. For example, the chain may comprise a first process 48 referencing EXPLORER.EXE that spawns a second process 48 referencing FIREFOX.EXE, that spawns a third process 48 referencing FIREFOXUPDATER.EXE that performed the communication activity that triggered a given alert 26. In these embodiments, processor 70 can perform a protective action on one or more of the processes in the chain (e.g., the third process, the second and third processes, or the first, second and third processes).

Additionally, in these embodiments, while the event category of the process that triggered a given alert 26 typically indicates communication activity, the event category of a given parent processes in the chain (e.g., EXPLORER. EXE and FIREFOX.EXE in the example described supra) may not indicate communication activity.

In additional embodiments, processor 70 can compare a given identified process ID 50 (i.e., in step 108) to process IDs 98 in application families 76. In these embodiments, processor 70 can compare the process ID identified by model 24 to process IDs 98 and detect a match between the process ID identified by the model and a given process ID 9 in a given application family 76. Processor 70 can then perform any of the protective actions described supra on any processes 48 executing on the given host computer whose respective process ID 86 matches any process ID 98 in the given application family.

Furthermore, while embodiments described hereinabove describe enriching alerts 26, using these embodiments to enrich event reports 56 is considered to be within the spirit and scope of the present invention.

In a further embodiment, processor 42 can use embodiments described supra (i.e., in the description referencing steps 106-108) to enrich specific event reports 56B. In other words, processor 42 can perform in response to a specific event report 56B even if the processor does not receive a given alert 26 referencing the specific event report. In these embodiments, upon receiving the specific report, processor 42 can:

Generates additional features 90 from the specific event reports 56B.

Apply model 70 to the specific event report and the generated features so as to identify, one or more process IDs 50 of one or more processes 48 on a given host computer 30 that performed the communication activity referenced by the specific event report, and is/are therefore responsible for communication activity in the specific event report.

Initiates a protective action with respect to at least the identified one or more processes.

For example, processor 42 can use these further embodiments to flag any communication activity to/from a specific domain and/or IP address.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:

collecting, during a time period from security agents executing on respective host computers, reports of communication events, each of the communication events comprising communication activity performed by a process having a respective process identifier (ID) and executing on one of the host computers;

generating, from each of the collected reports, a set of features comprising characteristics of the communication activity and the respective process ID;

training, by a processor, a machine learning model for identifying, based on the features of one or more of the events, the process ID of one of the processes performing the one or more of the events, wherein the machine learning model is trained using, as training data, the respective process IDs collected from the security agents during the time period;

receiving, from a network management device subsequent to the time period, an alert indicating malicious activity and referencing one or more reports of additional communication events performed by a given host computer;

applying the machine learning model to the one or more reports of additional communication events so as to identify, from among a plurality of processes executing on the given host computer, a given process that performed communication activity that triggered the alert, thereby identifying the given process ID of the given process; and initiating a protective action with respect to at least the given process executing on the given host computer.

2. The method according to claim 1, wherein the network management device comprises a firewall.

3. The method according to claim 1, wherein generating a given feature comprises extracting a given feature from a given collected report.

4. The method according to claim 3, wherein generating a given feature comprises normalizing the extracted given feature.

5. The method according to claim 3, wherein generating a given feature comprises computing the given feature based on one or more of the extracted features.

6. The method according to claim 3, wherein a given feature comprises a domain.

7. The method according to claim 3, wherein a given feature comprises an Internet Protocol (IP) address.

8. The method according to claim 7, wherein a given feature indicates whether or not the IP address comprises an Autonomous System Number (ASN).

9. The method according to claim 3, wherein a given feature comprises a JA3 fingerprint.

10. The method according to claim 3, wherein a given feature comprises a JA3S fingerprint.

11. The method according to claim 3, wherein a given feature comprises a Server Name Indication (SNI) hostname.

12. The method according to claim 3, wherein a given feature comprises the given process identifier.

13. The method according to claim 3, wherein a given feature comprises a logical port number.

14. The method according to claim 3, wherein a given feature comprises the process ID.

15. The method according to claim 3, wherein a given feature comprises one or more network protocols used in the communication activity.

16. The method according to claim 1, wherein applying the machine learning model comprises generating additional features from the one or more additional communication events, and applying the machine learning model to the additional features.

17. The method according to claim 1, wherein the host computers comprise first host computers, and wherein the given host computer comprises an additional host computer different from any of the first host computers.

18. The method according to claim 1, wherein initiating the protective action with respect to a given process comprises isolating the given process.

19. The method according to claim 1, wherein initiating the protective action with respect to a given process comprises presenting, on a display, details of the given process.

20. The method according to claim 1, wherein receiving the alert comprises receiving a given report for a specific communication event.

21. An apparatus, comprising:

a memory configured to store a machine learning model; and a processor configured:

to collect, during a time period from security agents executing on respective host computers, reports of communication events, each of the communication events comprising communication activity performed by a process having a respective process ID and executing on one of the host computers, to generate, from each of the collected reports, a set of features comprising characteristics of the communication activity and the respective process ID, to train the machine learning model to identify, based on the features of one or more of the events, the process ID of one of the processes performing the one or more of the events, wherein the machine learning model is trained using, as training data, the respective process IDs collected from the security agents during the time period, to receive, from a network management device subsequent to the time period, an alert indicating malicious activity and referencing one or more reports of additional communication events performed by a given host computer, to apply the machine learning model to the one or more reports of additional communication events so as to identify, from among a plurality of processes executing on the given host computer, a given process that performed communication activity that triggered the alert, thereby identifying the given process ID of the given process, and to initiate a protective action with respect to at least the given process executing on the given host computer.

22. A computer software product for protecting a computing device, which includes a processor and a memory and is coupled to a storage device storing a set of one or more files, the computer software product comprising a non-transitory computer-readable medium, in which program instructions are stored, which instructions, when read by a computer, cause the computer:

to collect, during a time period from security agents executing on respective host computers, reports of communication events, each of the communication events comprising communication activity performed by a process having a respective process ID and executing on one of the host computers;

to generate, from each of the collected reports, a set of features comprising characteristics of the communication activity and the respective process ID;

to train a machine learning model for identifying, based on the features of one or more of the events, the process ID of one of the processes performing the one or more of the events, wherein the machine learning model is trained using, as training data the respective process IDs collected from the security agents during the time period;

to receive, from a network management device subsequent to the time period, an alert indicating malicious activity and referencing one or more reports of additional communication events performed by a given host computer;

to apply the machine learning model to the one or more reports of additional communication events so as to identify, from among a plurality of processes executing on the given host computer, a given process that performed communication activity that triggered the alert, thereby identifying the given process ID of the given process; and to initiate a protective action with respect to at least the given process executing on the given host computer.

* * * * *